United States Patent
Tsukagoshi

(10) Patent No.: US 11,418,753 B2
(45) Date of Patent: Aug. 16, 2022

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 129 days.

(21) Appl. No.: 15/308,155

(22) PCT Filed: May 19, 2015

(86) PCT No.: PCT/JP2015/064384
§ 371 (c)(1),
(2) Date: Nov. 1, 2016

(87) PCT Pub. No.: WO2015/190246
PCT Pub. Date: Dec. 17, 2015

(65) Prior Publication Data
US 2017/0064242 A1    Mar. 2, 2017

(30) Foreign Application Priority Data

Jun. 13, 2014 (JP) .............................. JP2014-122910

(51) Int. Cl.
*H04N 5/57* (2006.01)
*H04N 19/70* (2014.01)
(Continued)

(52) U.S. Cl.
CPC .............. *H04N 5/57* (2013.01); *H04N 5/225* (2013.01); *H04N 7/08* (2013.01); *H04N 19/70* (2014.11);
(Continued)

(58) Field of Classification Search
CPC ........ H04N 5/57; H04N 5/225; H04N 21/435; H04N 21/45455; H04N 21/4854
(Continued)

(56) References Cited

U.S. PATENT DOCUMENTS

| 2006/0164524 A1* | 7/2006 | Shibano ................... H04N 5/20 348/234 |
| 2012/0026157 A1* | 2/2012 | Unkel ................... H04N 13/356 345/419 |

(Continued)

FOREIGN PATENT DOCUMENTS

| CN | 102497490 A | 6/2012 |
| CN | 103843058 A | 6/2014 |

(Continued)

OTHER PUBLICATIONS

International Search Report dated Jul. 21, 2015 in PCT/JP2015/064384 filed May 19, 2015.

(Continued)

*Primary Examiner* — Kathleen V Nguyen
(74) *Attorney, Agent, or Firm* — Oblon, McClelland, Maier & Neustadt, L.L.P.

(57) ABSTRACT

The feel of brightness intended by a production side is satisfactorily reproduced on a reception side.
Transmission video data is acquired by applying a predetermined opto-electrical transfer function to input video data. The transmission video data is transmitted along with region information indicating a region in which a brightness conversion is allowed. A transmission unit for example transmits a video stream acquired by encoding the transmission video data, and the region information is inserted into a layer of the video stream. On the reception side, an electro-optical transfer function corresponding to the predetermined opto-electrical transfer function is applied to the (Continued)

transmission video data, and display video data is acquired by performing brightness conversion processing on the basis of the region information.

13 Claims, 13 Drawing Sheets

(51) Int. Cl.
   *H04N 19/85*      (2014.01)
   *H04N 21/4545*   (2011.01)
   *H04N 21/485*     (2011.01)
   *H04N 21/435*     (2011.01)
   *H04N 21/426*     (2011.01)
   *H04N 5/225*       (2006.01)
   *H04N 7/08*        (2006.01)

(52) U.S. Cl.
   CPC .......... *H04N 19/85* (2014.11); *H04N 21/426* (2013.01); *H04N 21/435* (2013.01); *H04N 21/45455* (2013.01); *H04N 21/4854* (2013.01)

(58) Field of Classification Search
   USPC .................................................. 375/240.14
   See application file for complete search history.

(56) References Cited

U.S. PATENT DOCUMENTS

| | | | |
|---|---|---|---|
| 2013/0148029 A1* | 6/2013 | Gish .................. | G09G 5/02 348/708 |
| 2014/0210847 A1* | 7/2014 | Knibbeler ............ | H04N 9/68 345/589 |
| 2015/0003749 A1* | 1/2015 | Kim .................... | H04N 19/463 382/232 |
| 2015/0010059 A1 | 1/2015 | Hattori et al. | |

FOREIGN PATENT DOCUMENTS

| | | |
|---|---|---|
| WO | 2013/046095 A1 | 4/2013 |
| WO | 2014/002901 A1 | 1/2014 |
| WO | WO 2014/008188 A1 | 1/2014 |
| WO | 2014/178286 A1 | 11/2014 |

OTHER PUBLICATIONS

Brass, Benjamin et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Jan. 14-23, 2013, Document: JCTVC-L1003_v9, 334 pages.

Hattori, Sally et al., "HLS: SEI message for Knee Function Information," Joint Collaborative Team on Video Coding (JCT-VC) of ITU-T SG 16 WP 3 and ISO/IEC JTC 1/SC 29/WG 11, Jan. 9-17, 2014, Document: JCTVC-P0050-v2, 21 pages.

Hattori, Sally et al., "HLS: SEI message for transfer function information," Joint Collaborative Team on Video Coding (JCT-VC) of ITU-T SG 16 WP 3 and ISO/IEC JTC 1/SC 29/WG 11, Oct. 23-Nov. 1, 2013, Document: JCTVC-O0064, 4 pages.

Hattori, Sally et al., "Signalling of Luminance Dynamic Range in Tone mapping information SEI," Joint Collaborative Team on Video Coding (JCT-VC) of ITU-T SG 16 WP 3 and ISO/IEC JTC 1/SC 29/WG 11, Jul. 11-20, 2012, Document: JCTVC-J0149, 7 pages.

Extended European Search Report dated Dec. 14. 2017 in Patent Application No. 15806088.9.

S. Hattori, et al., "SEI message for Knee Function Information", JCTVC-P0050, Sony, XP002745638, 2014, 7 pages.

Office Action dated Jan. 9, 2019 in Chinese Application No. 201580030229.2, along with an English translation.

Office Action dated Jan. 22, 2019 in Japanese Application No. 2016-527715.

Office Action dated Dec. 6, 2019 in Chinese Application No. 2015800302292, along with an English translation.

Office Action dated Jun. 16, 2020 in corresponding Japanese Patent Application No. 2019-095631; 5 pages.

* cited by examiner

DISPLAY BRIGHTNESS CHARACTERISTIC OF MASTER MONITOR

EXAMPLE OF ARRANGEMENT OF SEI AS HEVC ENCODED STREAM

EXAMPLE OF ARRANGEMENT OF SEI AS HEVC ENCODED STREAM

FIG. 7

Level_mapping SEI syntax

| Syntax | No. of Bits | Format |
|---|---|---|
| Level_mapping SEI ( ) { | | |
|   level_mapping_id | ue(v) | |
|   level_mapping_cancel_flag | u(1) | bmlbf |
|   if( !level_mapping_cancel_flag ) { | | |
|     coded_data_bit_depth | 8 | uimslbf |
|     reference_white_level | 16 | uimslbf |
|     reference_white_level_code_value | 16 | uimslbf |
|     number_of_thresholds | 8 | |
|     for ( i = 0; i< number_of_thresholds; i++){ | | |
|       compliant_threshold_level | 16 | uimslbf |
|       compliant_threshold_level_value | 16 | uimslbf |
|     } | | |
|     peak_percentage | 8 | uimslbf |
|     peak_percentage_value | 16 | uimslbf |
|   } | | |
| } | | |

FIG. 8

Level_mapping SEI semantics level_mapping_cancel_flag (1bit)
    1 CANCEL MESSAGE STATUS OF Level_mapping UP TO THAT POINT.
    0 TRANSMIT EACH ELEMENT AND REFRESH PREVIOUS STATUS THEREWITH.
coded_data_bit_depth (8bits)
    SPECIFY BIT LENGTH (8 TO 14 bits) OF ENCODED PIXEL DATA.
reference_white_level (16bits)
    cd/m2 VALUE OF MASTER MONITOR AT ITS 100%
reference_white_level_code_value (16bits)
    CODE VALUE AT 100% BRIGHTNESS LEVEL, OR VALUE WITH BIT ACCURACY INDICATED BY coded_data_bit_depth.
number_of_thresholds (8bits)
    INDICATES NUMBER OF THRESHOLD DIVISIONS OF DISPLAY MAPPING.
compliant_threshold_level (16bits)
    INDICATES THRESHOLD LEVEL (PERCENTAGE) ASSUMING DISPLAY MAPPING,
    OR LEVEL RELATIVE TO 100% BRIGHTNESS.
compliant_threshold_level_value (16bits)
    INDICATED WITH CODE VALUE TRANSMITTING THRESHOLD ASSUMING DISPLAY MAPPING, OR MAXIMUM VALUE OF BRIGHTNESS
    WITH WHICH BRIGHTNESS OF CE MONITOR DISPLAY ASSUMED BY PRODUCTION SIDE IS TO CORRESPOND, WHERE LEVEL
    EXCEEDING THIS VALUE INDICATES RANGE IN WHICH BRIGHTNESS IS ALLOWED TO CHANGE DEPENDING ON DISPLAY CAPABILITY.
peak_percentage (8bits)
    VALUE OF MAXIMUM BRIGHTNESS LEVEL EXPRESSED IN RATIO WITH RESPECT TO 100% ON PRODUCTION SIDE.
    PEAK BRIGHTNESS 1000cd/m2 CORRESPONDS TO peak_percentage OF 1000%, FOR EXAMPLE.
peak_luminance_value (16bits)
    MAXIMUM CODE VALUE EXPRESSING peak_percentage WHEN DATA IS TRANSMITTED WITH BIT ACCURACY INDICATED
    BY coded_data_bit_depth. When "peak_percentage" EQUALS 1000%, FOR EXAMPLE,
    MAXIMUM VALUE "1019" AT THE TIME OF 10-bit TRANSMISSION EXPRESSES 1000%.

FIG. 9
(a)
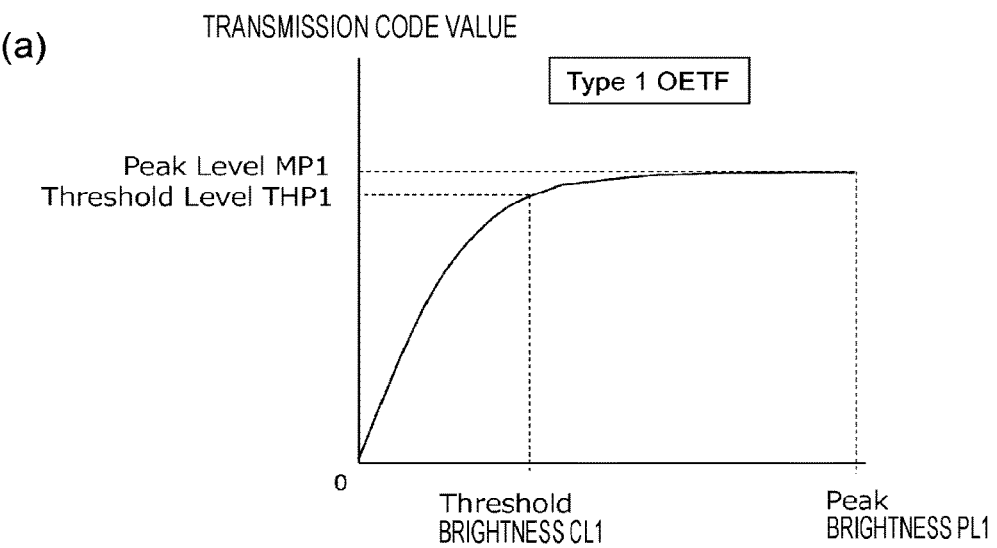
(b)
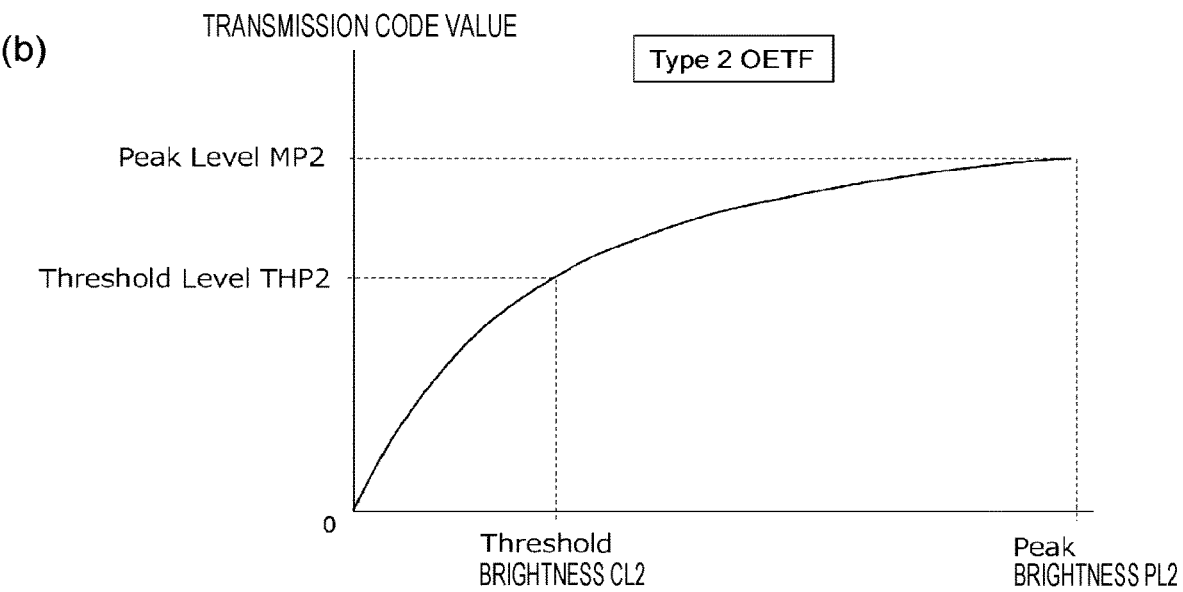

FIG. 15

Level_mapping SEI syntax

| Syntax | No. of Bits | Format |
|---|---|---|
| Level_mapping SEI ( ) { | | |
| level_mapping_id | ue(v) | |
| level_mapping_cancel_flag | u(1) | bmlbf |
| if( !level_mapping_cancel_flag ) { | | |
| coded_data_bit_depth | 8 | uimslbf |
| reference_white_level | 16 | uimslbf |
| reference_white_level_code_value | 16 | uimslbf |
| peak_percentage | 8 | uimslbf |
| peak_percentage_value | 16 | uimslbf |
| } | | |
| } | | |

FIG. 16
(a)
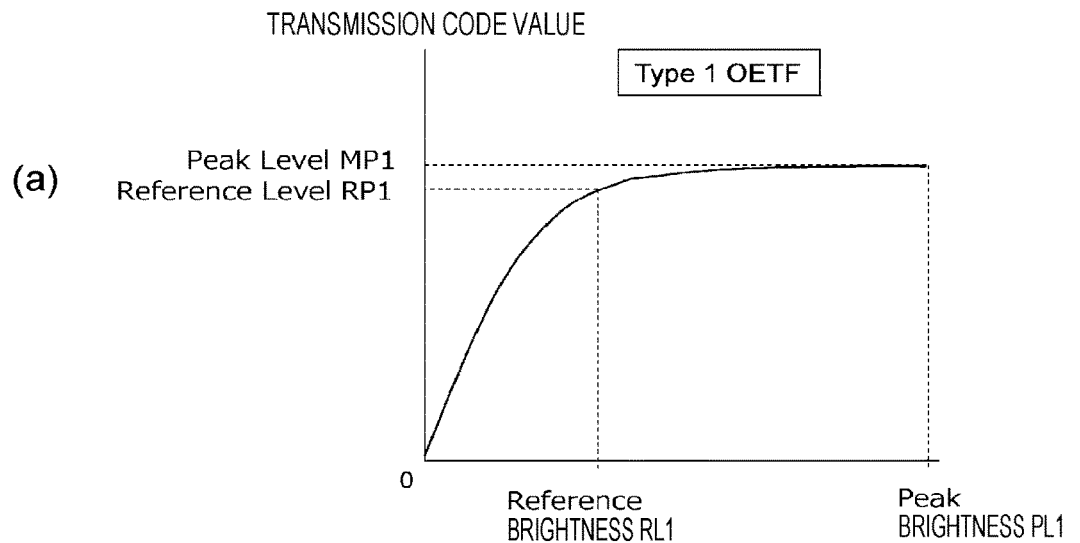
(b)
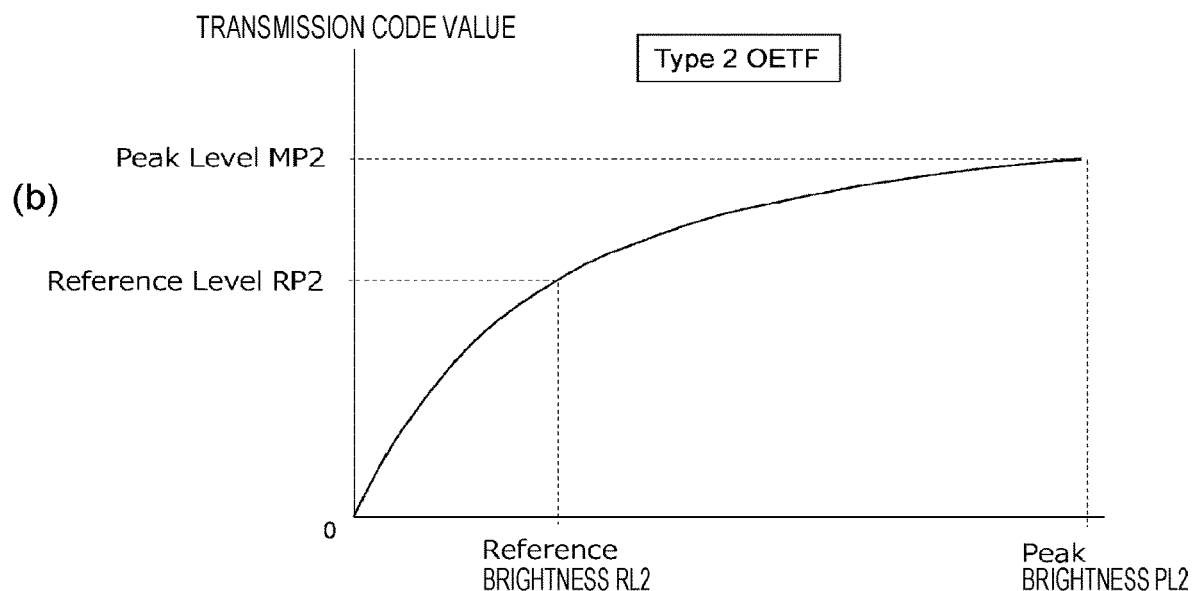
FIG. 17
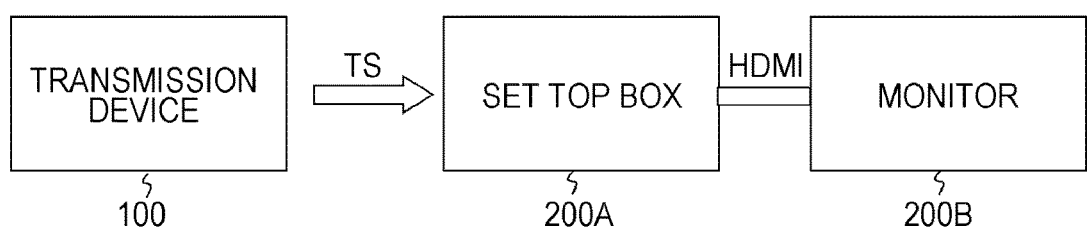

TRANSMISSION DEVICE, TRANSMISSION METHOD, RECEPTION DEVICE, AND RECEPTION METHOD

TECHNICAL FIELD

The present technology relates to a transmission device, a transmission method, a reception device and a reception method, particularly to a transmission device and the like transmitting transmission video data that is obtained by application of a predetermined opto-electrical transfer function to input video data.

BACKGROUND ART

A video service using a high dynamic range (HDR) is one that reflects the intention of a production side and supplies a video service with a wide brightness range to allow a receiver side to reproduce the video, thereby realizing reproduction of display close to the perception of a human eye in nature.

Non-Patent Document 1 for example discloses transmission of a video stream that is generated by encoding transmission video data obtained by application of a gamma curve to input video data having a level of 0 to 100%*N (where N is larger than one).

The peak brightness of a monitor (CE monitor) on the receiver side varies widely depending on a device characteristic, a backlight arrangement and a design technique of a display panel and may be too bright or dark compared to a master monitor used in program production. This s can possibly cause improper reproduction of the feel of brightness intended by the production side.

CITATION LIST

Non-Patent Document

Non-Patent Document 1: High Efficiency Video Coding (HEVC) text specification draft 10 (for FDIS & Last Call)

SUMMARY OF THE INVENTION

Problems to be Solved by the Invention

An object of the present technology is to enable the reception side to satisfactorily reproduce the feel of brightness intended by the production side.

Solutions to Problems

A concept of the present technology is a transmission device including:

a processing unit that acquires transmission video data by applying a predetermined opto-electrical transfer function to input video data; and a transmission unit that transmits the transmission video data along with region information indicating a region in which a brightness conversion is allowed.

In the present technology, the processing unit applies the predetermined opto-electrical transfer function to the input video data to acquire the transmission video data. The input video data is for example video data of a high dynamic range (HDR) image with a contrast ratio of 0 to 100%*N (where N is a number larger than 1) exceeding brightness of the white peak in a conventional low dynamic range (LDR) image.

The transmission video data is transmitted by the transmission unit along with the region information indicating the region in which the brightness conversion is allowed. The transmission unit may transmit a video stream acquired by encoding the transmission video data, and there may be further provided an information insertion unit that inserts the region information into a layer of the video stream, for example.

In this case, for example, the information insertion unit may be adapted to insert metadata as the region information, the metadata indicating the region in which the brightness conversion is allowed. Moreover, for example, the information insertion unit may be adapted to insert, as the region information, a piece of information specifying the predetermined opto-electrical transfer function with which the region allowing the brightness conversion is associated. Furthermore, for example, the region information may include information of a plurality of regions each having a different allowable level of the brightness conversion.

According to the present technology, the transmission video data is transmitted along with the region information indicating the region in which the brightness conversion is allowed. As a result, the feel of brightness intended by the production side can be satisfactorily reproduced on the reception side.

Moreover, another concept of the present technology is a reception device including:

a reception unit that receives transmission video data acquired by applying a predetermined opto-electrical transfer function to input video data along with region information indicating a region in which a brightness conversion is allowed; and a processing unit that applies an electro-optical transfer function corresponding to the predetermined opto-electrical transfer function to the transmission video data and acquires output video data by performing brightness conversion processing on the basis of the region information.

The reception unit receives the transmission video data along with the region information indicating the region in which the brightness conversion is allowed. The transmission video data is acquired by applying the predetermined opto-electrical transfer function to the input video data. The input video data is for example video data of a high dynamic range (HDR) image with a contrast ratio of 0 to 100%*N (where N is a number larger than 1) exceeding brightness of the white peak in a conventional low dynamic range (LDR) image. The processing unit then applies, to the transmission video data, an electro-optical transfer function or the like inverse of and corresponding to the predetermined opto-electrical transfer function and performs brightness conversion processing on the basis of the region information to acquire the output video data.

The reception unit may receive a video stream acquired by encoding the transmission video data, and the region information may be inserted into a layer of the video stream, for example. In this case, for example, metadata may be inserted as the region information, the metadata indicating the region in which the brightness conversion is allowed. Moreover, for example, apiece of information specifying the predetermined opto-electrical transfer function with which the region allowing the brightness conversion is associated may be inserted as the region information. Furthermore, for example, the region information may include information of a plurality of regions each having a different allowable level of the brightness conversion.

According to the present technology, the transmission video data is received along with the region information indicating the region in which the brightness conversion is allowed, so that the output video data is acquired by performing the brightness conversion processing on the basis of the region information. As a result, the feel of brightness intended by the production side can be satisfactorily reproduced.

Effects of the Invention

According to the present technology, the feel of brightness intended by the production side can be satisfactorily reproduced on the reception side. Note that the effect described in the present specification is provided by way of example only and not by way of limitation, where there may be obtained an additional effect as well.

BRIEF DESCRIPTION OF DRAWINGS

FIG. 7 is a table illustrating an example of the structure of a level_mapping SEI message.

FIG. 8 is a diagram illustrating details of main information in the example of the structure of the level_mapping SEI message.

FIGS. 9(a) and 9(b) are graphs each illustrating an example of the opto-electrical transfer function (OETF) with which a region allowing a brightness conversion is associated in advance.

FIG. 15 is a table illustrating an example of the structure of the level_mapping SEI message transmitted when a first transmission method is adopted.

FIGS. 16(a) and 16(b) are graphs each illustrating an example of the opto-electrical transfer function (OETF) with which a region allowing the brightness conversion is associated in advance when a second transmission method is adopted.

FIG. 17 is a block diagram illustrating an example of another configuration of the transmission/reception system.

MODES FOR CARRYING OUT THE INVENTION

Figure 1:
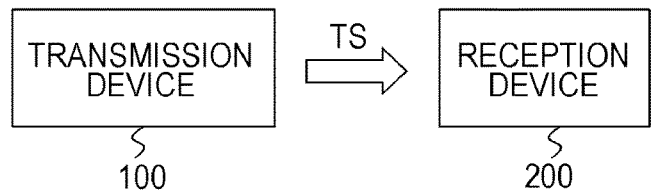
FIG. 1 is a block diagram illustrating an example of the configuration of a transmission/reception system according to an embodiment.

Modes for carrying out the invention (hereinafter referred to as "embodiments") will now be described. Note that the description will be provided in the following order.
1. Embodiment
2. Variation 1. First Embodiment Example of Configuration of Transmission/Reception System FIG. 1 illustrates an example of the configuration of a transmission/reception system 10 according to an embodiment. The transmission/reception system 10 includes a transmission device 100 and a reception device 200.

The transmission device 100 generates a transport stream TS in MPEG2 as a container and transmits the transport stream TS on a broadcast wave or an Internet packet. The transport stream TS includes a video stream acquired by encoding transmission video data that is obtained by application of a predetermined opto-electrical transfer function to input video data.

The input video data is for example video data of a high dynamic range (HDR) image with a contrast ratio of 0 to 100%*N (where N is a number larger than 1) exceeding brightness of the white peak in a conventional low dynamic range (LDR) image. Here, a 100% level is assumed to be a brightness level corresponding to 100 cd/m2 being a brightness value of white.

Region information indicating a region in which a brightness conversion is allowed is inserted into a layer of the video stream. When a first transmission method is adopted, a piece of metadata indicating the region in which the brightness conversion is allowed is inserted into the layer of the video stream. On the other hand, when a second transmission method is adopted, there is inserted a piece of information specifying the aforementioned predetermined opto-electrical transfer function with which the region allowing the brightness conversion is associated. The region information will be described in detail later on.

The reception device 200 receives the transport stream TS transmitted on the broadcast wave or Internet packet from the transmission device 100. The transport stream TS includes the video stream including the encoded video data. As described above, the region information indicating the region in which the brightness conversion is allowed is inserted into the video stream.

The reception device 200 acquires output video data by applying, for example, an electro-optical transfer function inverse of and corresponding to the aforementioned predetermined opto-electrical transfer function on a transmission side to the transmission video data and performing brightness conversion processing thereon on the basis of the region information. In this case, the brightness conversion dependent on, for example, the peak brightness of a monitor is performed only in the region allowing the brightness conversion.

[Example of Configuration of Transmission Device]

Figure 2:
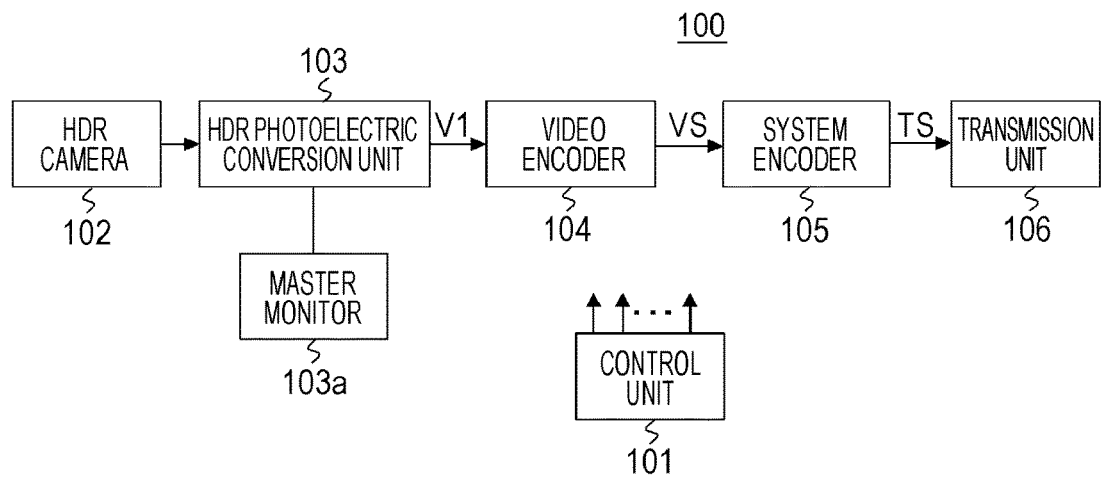
FIG. 2 is a block diagram illustrating an example of the configuration of a transmission device included in the transmission/reception system.

FIG. 2 illustrates an example of the configuration of the transmission device 100. The transmission device 100 includes a control unit 101, an HDR camera 102, an HDR photoelectric conversion unit 103, a video encoder 104, a system encoder 105 and a transmission unit 106. The control unit 101 includes a central processing unit (CPU) and controls the operation of each unit in the transmission device 100 on the basis of a control program stored in a storage not shown.

The HDR camera 102 images a subject to output high dynamic range (HDR) video data. The HDR video data has a contrast ratio of 0 to 100%*N (where N is a number larger than 1) such as 0 to 1000% exceeding brightness of the white peak in a conventional low dynamic range (LDR) image. Here, a 100% level corresponds to 100 cd/m2 being the brightness value of white, for example. Note that "cd/m2" represents "cd/square meter".

A master monitor 103a is a monitor that performs grading on the HDR video data acquired by the HDR camera 102. The master monitor 103a has a display brightness level corresponding to the HDR video data or suitable for grading the HDR video data.

Figure 3:
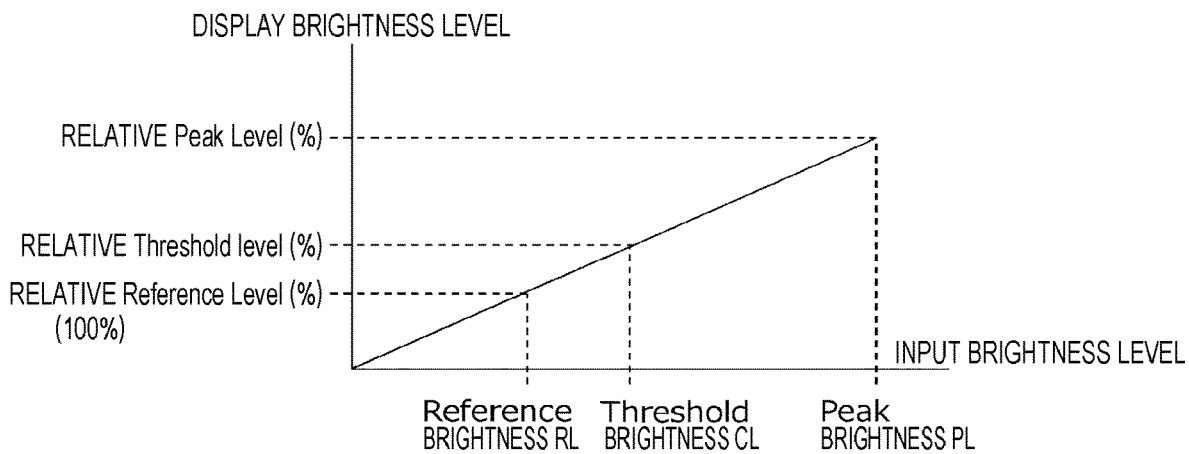
FIG. 3 is a diagram illustrating an example of a display brightness characteristic of a master monitor.

FIG. 3 illustrates a display brightness characteristic of the master monitor 103a. A horizontal axis and a vertical axis of the graph represent an input brightness level and the display brightness level, respectively. When the input brightness level equals reference brightness RL, the display brightness level equals a relative reference level (%) such as 100% corresponding to 100 cd/m2 being the brightness value of white. Moreover, the display brightness level equals a relative peak level (%) when the input brightness level equals peak brightness PL.

Note that threshold brightness CL is newly defined in the present embodiment and indicates a boundary between a region in which the brightness corresponds with brightness displayed in a monitor (CE monitor) on the side of a receiver and a region in which the brightness is dependent on the CE monitor. The display brightness level equals a relative threshold level (%) when the monitor input brightness level equals the threshold brightness CL.

Referring back to FIG. 2, the HDR photoelectric conversion unit 103 applies an opto-electrical transfer function for an HDR image (HDR OETF curve) to the HDR video data acquired by the HDR camera 102 and acquires transmission video data V1.

Figure 4:
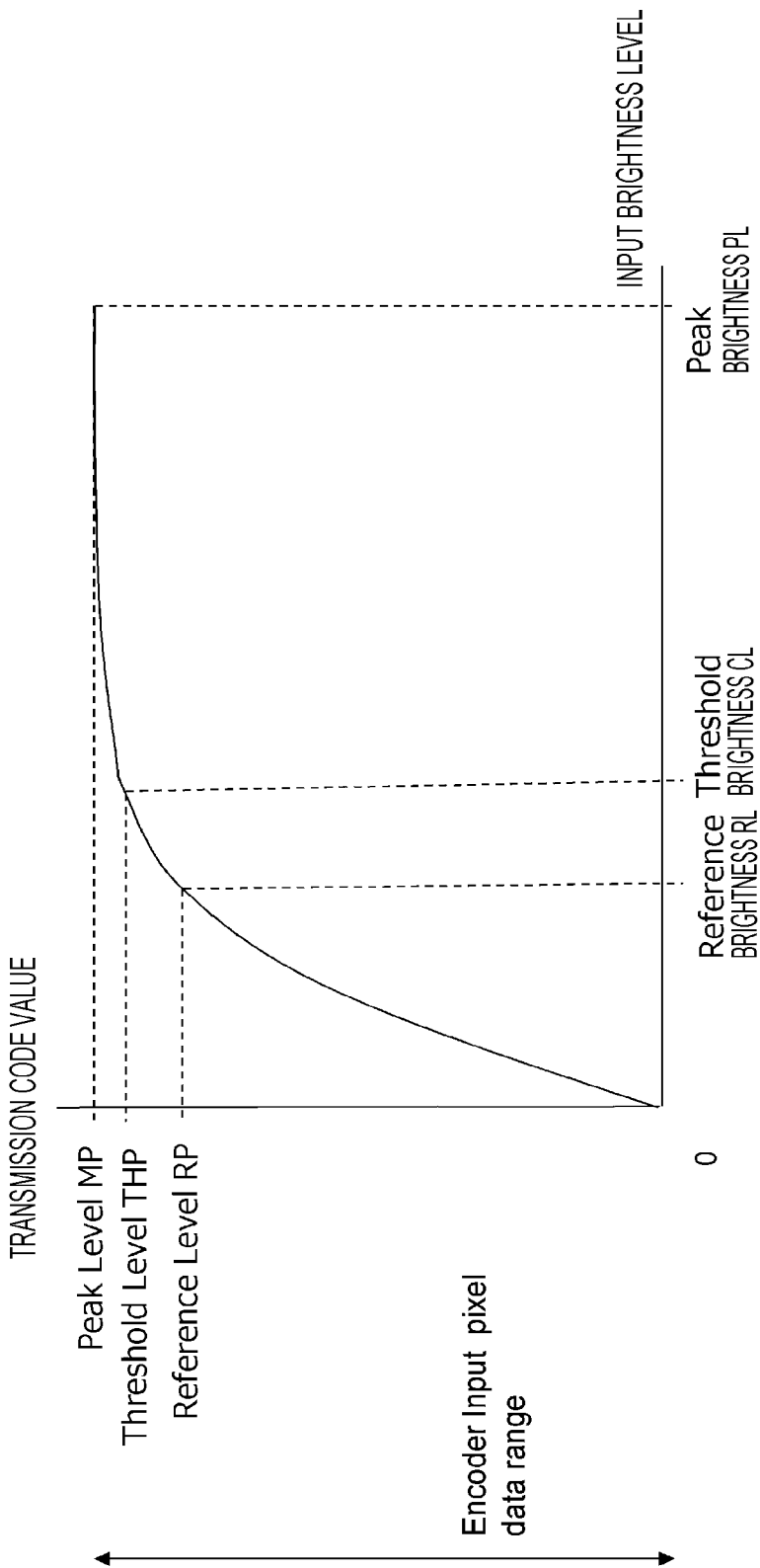
FIG. 4 is a graph illustrating an example of an opto-electrical transfer function (OETF).

FIG. 4 illustrates an example of the opto-electrical transfer function (OETF). In the graph, a horizontal axis represents the input brightness level as with the horizontal axis of the graph of the display brightness characteristic of the master monitor described above (refer to FIG. 3), and a vertical axis represents a transmission code value. The transmission code value equals a reference level RP when the input brightness level equals the reference brightness RL. Moreover, the transmission code value equals a peak level MP when the input brightness level equals the peak brightness PL. Furthermore, the transmission code value equals a threshold level THP when the input brightness level equals the threshold brightness CL.

Note that a range of the transmission code value on the vertical axis corresponds to an input pixel data range of the video encoder 104 (an encoder input pixel data range). In the case of 10-bit encoding, for example, the range equals "64" to "940" or "4" to "1019" with use of an extended region.

Referring back to FIG. 2, the video encoder 104 encodes the transmission video data V1 by MPEG4-AVC, MPEG2 video or high efficiency video coding (HEVC), for example, and acquires encoded video data. The video encoder 104 further uses a stream formatter (not shown) provided in a subsequent stage to generate a video stream (video elementary stream) containing the encoded video data.

At this time, the video encoder 104 inserts into a layer of the video stream the region information indicating the region allowing the brightness conversion dependent on the display side. When the first transmission method is adopted, the metadata indicating the region in which the brightness conversion is allowed is inserted into the layer of the video stream. When the second transmission method is adopted, there is inserted the information specifying the aforementioned opto-electrical transfer function which is applied by the HDR photoelectric conversion unit 103 and with which the region allowing the brightness conversion is associated.

[Insertion of Region Information]

The insertion of the region information indicating the region in which the brightness conversion is allowed will be described in detail.

[When First Transmission Method is Adopted]

First, there will be described the case where the first transmission method is adopted. A newly defined level_mapping SEI message is inserted into a part corresponding to "SEIs" of an access unit (AU).

Figure 5:
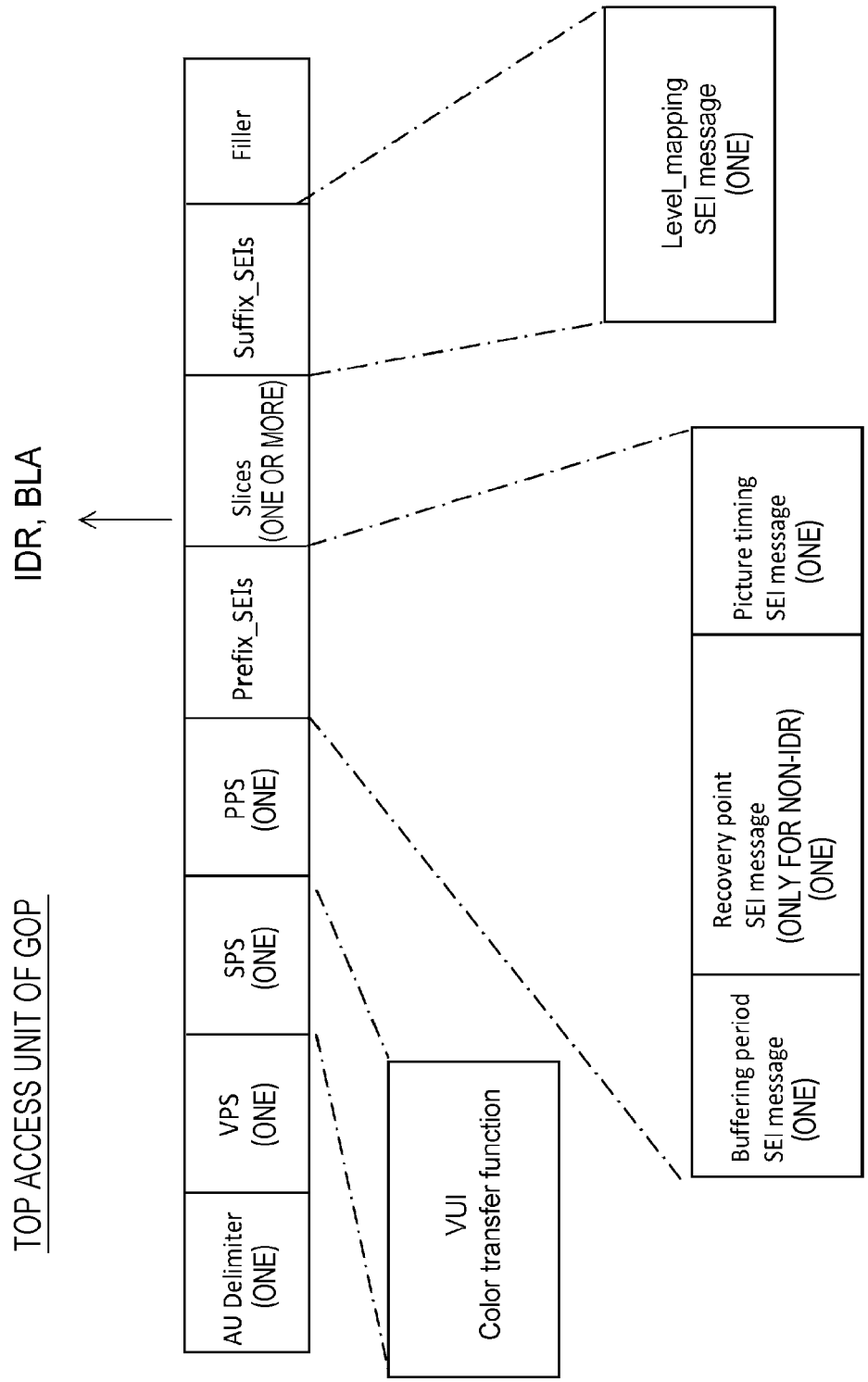
FIG. 5 is a diagram illustrating a top access unit of a GOP when HEVC is employed as an encoding scheme.
Figure 6:
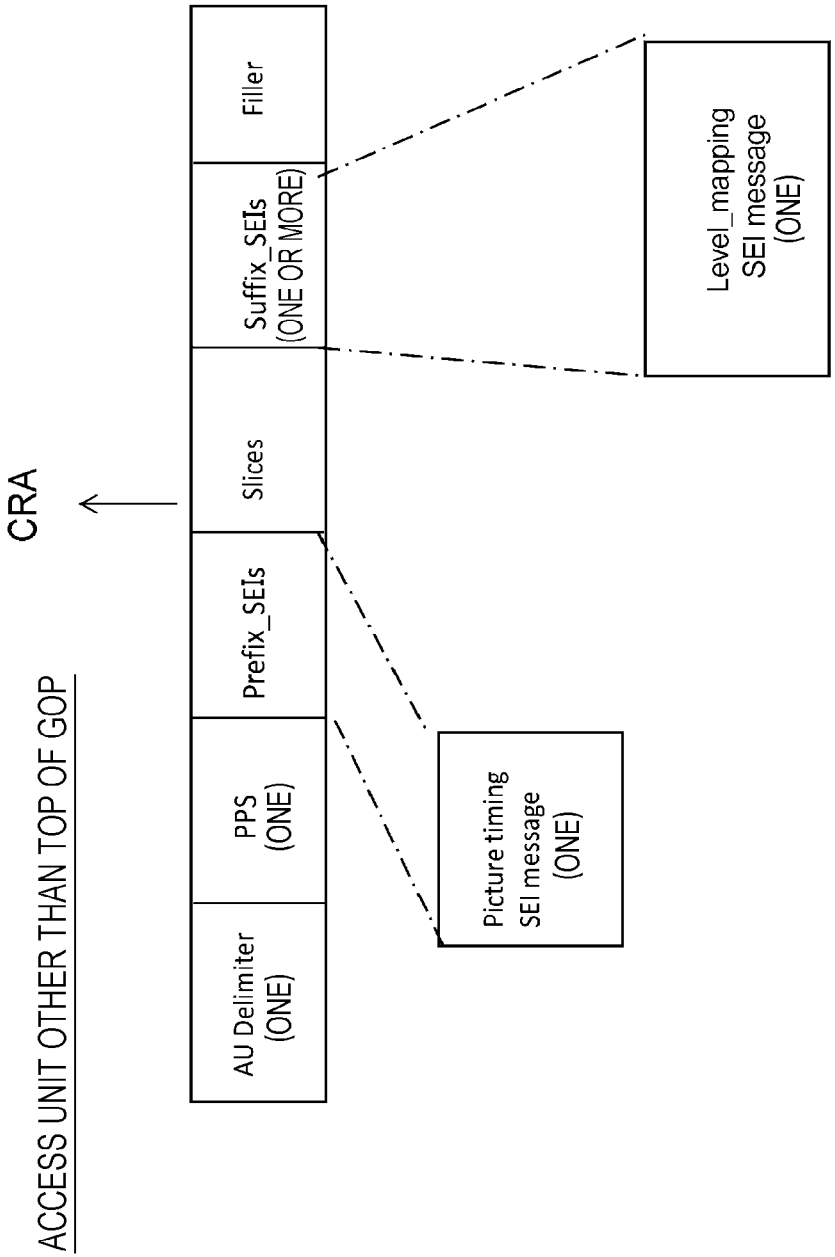
FIG. 6 is a diagram illustrating an access unit other than the top of the GOP when HEVC is employed as the encoding scheme.

FIG. 5 illustrates a top access unit of a group of pictures (GOP) when HEVC is employed as the encoding scheme. Moreover, FIG. 6 illustrates an access unit other than the top of the GOP when HEVC is employed as the encoding scheme. When HEVC is employed as the encoding scheme, an SEI message group "Prefix_SEIs" for decoding is arranged in front of slices in which pixel data is encoded, and an SEI message group "Suffix_SEIs" for display is arranged after the slices. As illustrated in FIGS. 5 and 6, the level_mapping SEI message is arranged as the SEI message group "Suffix_SEIs".

FIG. 7 illustrates an example of the structure (Syntax) of the level_mapping SEI message. FIG. 8 illustrates details (Semantics) of main information in the example of the structure. A syntax "level_mapping_cancel_flag" is 1-bit flag information. A value "1" indicates that a message status of level_mapping up to that point is cancelled. A value "0" indicates that each element is transmitted to refresh a previous status therewith.

An 8-bit field of "coded_data_bit_depth" indicates the bit length of the encoded data for which 8 to 14 bits are used, for example. A 16-bit field of "reference_white_level" indicates the input brightness value of the master monitor 103a at its 100%, namely the reference brightness RL. A 16-bit field of "reference_white_level_code_value" indicates a code value at the 100% brightness level or a value with the bit accuracy indicated by "coded_data_bit_depth", namely the reference level RP.

An 8-bit field of "number_of_thresholds" indicates the number of threshold divisions of display mapping. A 16-bit field of "compliant_threshold_level" and a 16-bit field of "compliant_threshold_level_value" exist repeatedly for the number of threshold divisions. The number equals "1" in the present embodiment.

The field of "compliant_threshold_level" indicates a threshold level (percentage) assuming the display mapping or a level relative to the 100% brightness, namely the threshold brightness CL. The field of "compliant_threshold_level_value" indicates a code value transmitting the threshold assuming the display mapping, namely the threshold level THP. This value is the maximum value of brightness with which the brightness in CE monitor display assumed by the production side is to correspond, where a level exceeding the value indicates a region (range) in which the brightness is allowed to change depending on the display capability of the CE monitor.

Note that this definition is provided for a first threshold. When there exists second and successive thresholds with the values larger than the first threshold, such thresholds correspond to information on a plurality of regions (region division information) having different allowable levels of brightness conversion.

An 8-bit field of "peak_percentage" indicates a value of the maximum brightness level expressed by a ratio with respect to 100% on the production side. The peak brightness 1000 cd/m2 corresponds to "peak_percentage" of 1000%, for example. A 16-bit field of "peak_percentage_value" indicates a maximum code value expressing "peak_percentage", namely the peak level MP, when data is transmitted with the bit accuracy indicated by "coded_data_bit_depth". When "peak_percentage" equals 1000%, for example, the maximum value "1019" at the time of 10-bit transmission expresses 1000%.

In the aforementioned level_mapping SEI message, the information of "compliant_threshold_level" and "compliant_threshold_level_value" makes up the region information indicating the region in which the brightness conversion is allowed. As a result, the reception side can detect the region information indicating the region in which the brightness conversion is allowed from the level_mapping SEI message. When the first transmission method is adopted, the region allowing the brightness conversion can be specified for each picture, scene, program or the like. Note that when the first transmission method is adopted, it is assumed that the type of the target opto-electrical transfer function (OETF) is transmitted in video usability information (VUI) in a NAL unit of a sequence parameter set (SPS).

[When Second Transmission Method is Adopted]

Next, there will be described the case where the second transmission method is adopted. As illustrated in FIG. 5, the video usability information (VUI) is inserted in the NAL unit of the sequence parameter set (SPS) in the top access unit of the GOP.

Among header information encoded by the sequence as the SPS, the VUI specifies timing information of buffer management as well as a parameter relevant to display control performed after decoding, and contains information indicating a control method that realizes image display such as an aspect ratio of a screen, a color gamut, the type of the opto-electrical transfer function (OETF) and the type of an RGB conversion matrix.

As for the type of the OETF, there can be specified "Rec. ITU-R BT. 709-5" as "Type=1" and "Rec. ITU-R BT. 2020 for 10 bit" as "Type=14" under the present conditions. These two types of OETF functions are equal and expressed as follows.

$$V=1.099*Lc0.45-0.099 \text{ for } 1>=Lc>=0.018$$

$$V=4.500*Lc \text{ for } 0.018>Lc>=0$$

The reception side is assumed to convert the aforementioned function into an inverse function thereof as the EOTF or an inverse OETF.

In the present embodiment, the OETF applied by the HDR photoelectric conversion unit 103 is one of the OETFs with which the region allowing the brightness conversion is associated in advance. Specifically, each of the following information is defined as the specification of each OETF, for example. Here, the information of "compliant_threshold_level" and "compliant_threshold_level_value" makes up the region information indicating the region in which the brightness conversion is allowed. Note that while detailed description is omitted herein, the content of each information is the same as the information corresponding to the aforementioned level_mapping SEI message.

"coded_data_bit_depth"
"reference_white_level"
"reference_white_level_code_value"
"compliant_threshold_level"
"compliant_threshold_level_value"
"peak_percentage"
"peak_percentage_value"

FIGS. 9(*a*) and 9(*b*) are graphs each illustrating an example of the opto-electrical transfer function (OETF) with which the region allowing the brightness conversion is associated in advance. According to the OETF of a first type illustrated in FIG. 9(*a*), the peak brightness equals PL1 and the corresponding transmission code value equals MP1. In the OETF of the first type, the threshold brightness CL1 and the threshold level THP1 are defined as the region information indicating the region in which the brightness conversion is allowed. Moreover, according to the OETF of a second type illustrated in FIG. 9(*b*), the peak brightness equals PL2 and the corresponding transmission code value equals MP2. In the OETF of the second type, the threshold brightness CL2 and the threshold level THP2 are defined as the region information indicating the region in which the brightness conversion is allowed.

Then the VUI specifies the OETF applied by the HDR photoelectric conversion unit 103, namely the OETF with which the region allowing the brightness conversion is associated in advance. As a result, the reception side can uniquely detect the region information indicating the region in which the brightness conversion is allowed from the OETF specified in the VUI.

Note that the electro-optical transfer function (EOTF) is the inverse transform of the opto-electrical transfer function (OETF) in many cases. Therefore, the region information indicating the region allowing the brightness conversion (such as the information of "compliant_threshold_level" and "compliant_threshold_level_value") may be defined as the specification of the OETF to be able to represent the display side.

Referring back to FIG. 2, the system encoder 105 generates the transport stream TS including the video stream VS generated by the video encoder 104. The transmission unit 106 then transmits the transport stream TS on the broadcast wave or Internet packet to the reception device 200.

The operation of the transmission device 100 illustrated in FIG. 2 will be described briefly. The HDR video data acquired upon imaging by the HDR camera 102 is supplied to the HDR photoelectric conversion unit 103. The HDR video data acquired by the HDR camera 102 is subjected to grading by using the master monitor 103*a*. The HDR photoelectric conversion unit 103 applies the opto-electrical transfer function for an HDR image (the LDR OETF curve) to the HDR video data and acquires the transmission video data V1. The transmission video data V1 is supplied to the video encoder 104.

The video encoder 104 encodes the transmission video data V1 by MPEG4-AVC, MPEG2 video or HEVC, for example, and acquires the encoded video data. The video encoder 104 further uses the stream formatter (not shown) provided in the subsequent stage to generate the video stream (video elementary stream) VS containing the encoded video data.

At this time, the video encoder 104 inserts into a layer of the video stream the region information indicating the region in which the brightness conversion is allowed. When the first transmission method is adopted, as described above, the metadata indicating the region in which the brightness conversion is allowed is inserted into the layer of the video stream. Moreover, when the second transmission method is adopted, there is inserted the information specifying the aforementioned opto-electrical transfer function which is applied by the HDR photoelectric conversion unit 103 and with which the region allowing the brightness conversion is associated, as described above.

The video stream VS generated by the video encoder 104 is supplied to the system encoder 105. The system encoder 105 generates the MPEG2 transport stream TS containing the video stream. The transport stream TS is transmitted on the broadcast wave or Internet packet by the transmission unit 106 to the reception device 200.

[Example of Configuration of Reception Device]

Figure 10:
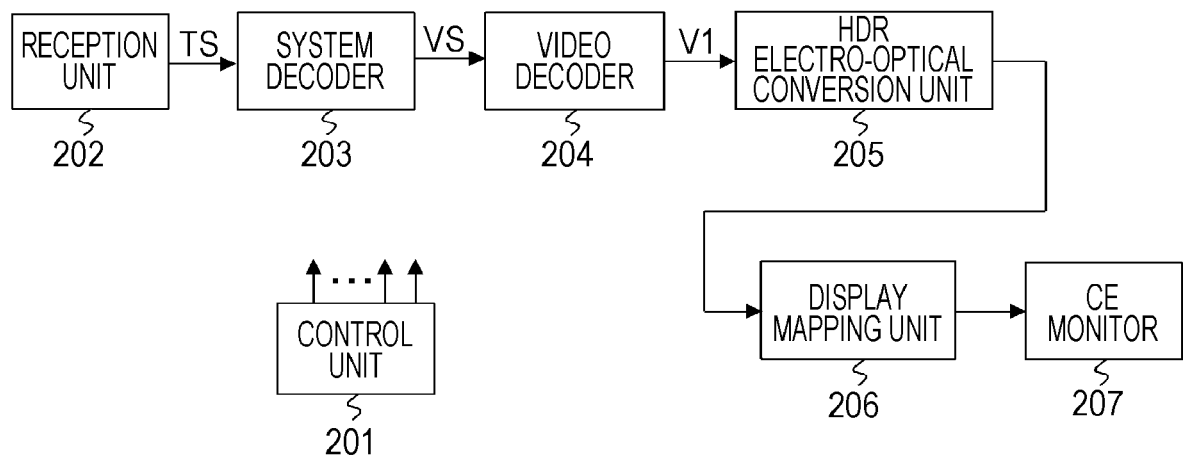
FIG. 10 is a block diagram illustrating an example of the configuration of a reception device included in the transmission/reception system.

FIG. 10 illustrates an example of the configuration of the reception device 200. The reception device 200 includes a control unit 201, a reception unit 202, a system decoder 203, a video decoder 204, an HDR electro-optical conversion unit 205, a display mapping unit 206, and a CE monitor 207. The control unit 201 includes a central processing unit (CPU) and controls the operation of each unit in the reception device 200 on the basis of a control program stored in a storage not shown.

The reception unit 202 receives the transport stream TS transmitted on the broadcast wave or Internet packet from the transmission device 100. The system decoder 203 extracts the video stream (elementary stream) VS from the transport stream TS. Moreover, the system decoder 203 extracts various pieces of information inserted in the layer of the container (transport stream) and transmits the information to the control unit 201.

The video decoder 204 decodes the video stream VS extracted by the system decoder 203 and outputs the transmission video data V1. Moreover, the video decoder 204 extracts and transmits to the control unit 201 the parameter set and the SEI message inserted in each access unit making up the video stream VS.

According to the type specification of the OETF in the video usability information (VUI) in the SPS, the control unit 201 recognizes the opto-electrical transfer function (OETF) applied on the transmission side and sets, for example, the electro-optical transfer function (EOTF) corresponding to and having an inverse characteristic of the OETF to the HDR electro-optical conversion unit 205.

Moreover, when the aforementioned second transmission method is adopted, the control unit 201 can uniquely detect the region information indicating the region allowing the brightness conversion (such as the information of "compliant_threshold_level" and "compliant_threshold_level_value") from the OETF specified in the VUI.

Moreover, when the aforementioned first transmission method is adopted, the aforementioned level_mapping SEI message is included as one of the SEI messages extracted by the video decoder 204 and transmitted to the control unit 201. The control unit 201 can acquire, from the level_mapping SEI message, the region information indicating the region in which the brightness conversion is allowed (the information of "compliant_threshold_level" and "compliant_threshold_level_value").

The HDR electro-optical conversion unit 205 applies, to the transmission video data V1 output from the video decoder 204, the electro-optical transfer function (EOTF) or the like corresponding to and having the inverse characteristic of the opto-electrical transfer function (OETF) used in the HDR photoelectric conversion unit 103 of the transmission device 100, and acquires output video data used to display an HDR image.

Figure 11:
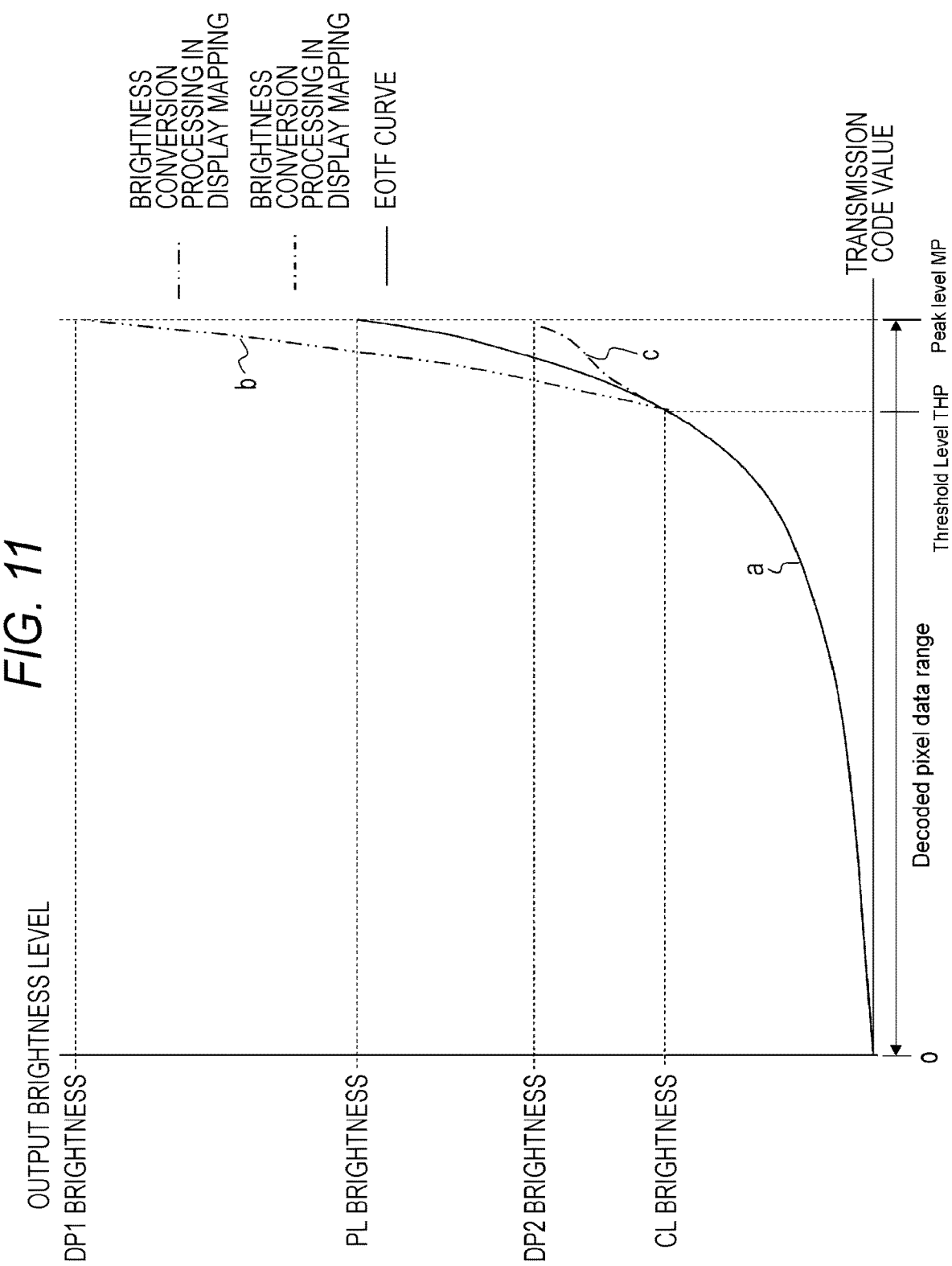
FIG. 11 is a graph illustrating an example of an electro-optical transfer function (EOTF).

FIG. 11 illustrates an example of the electro-optical transfer function (EOTF). A horizontal axis of the graph represents the transmission code value corresponding to the vertical axis of the graph in FIG. 4. A vertical axis represents an output brightness level (display brightness level) corresponding to the horizontal axis of the graph in FIG. 4. A solid line a in the graph represents an EOTF curve. The output brightness level equals PL when the transmission code value equals the peak level MP. Moreover, the output brightness level equals CL when the transmission code value equals the threshold level THP.

Here, when the maximum brightness display capability of the CE monitor 207 is higher than the maximum brightness PL assumed on the master monitor 103a, the output brightness level corresponding to a value of the transmission code value larger than the threshold level THP is processed by the display mapping unit 206 and allocated to a range up to a maximum display brightness level DP1 of the CE monitor 207 (high brightness processing). A two-dot chain line b in the graph represents an example of brightness conversion processing performed in that case.

On the other hand, when the maximum brightness display capability of the CE monitor 207 is lower than the maximum brightness PL assumed on the master monitor 103a, the output brightness level corresponding to a value of the transmission code value larger than the threshold level THP is processed by the display mapping unit 206 and allocated to a range up to a maximum display brightness level DP2 of the CE monitor 207 (low brightness processing). A dot and dash line c in the graph represents an example of brightness conversion processing performed in that case.

Referring back to FIG. 10, the display mapping unit 206 converts a level exceeding the brightness CL among the output brightness levels of the HDR electro-optical conversion unit 205 according to the maximum brightness display capability of the CE monitor 207, as described above. In this case, the brightness does not depend on the CE monitor 207 when the transmission code value equals the threshold level THP or lower, namely the output brightness level equals CL or lower, so that the brightness at the reception level is reproduced faithfully and that texture or the like is expressed correctly in accordance with the intention on the production side. The CE monitor 207 displays the HDR image on the basis of the output video data from the display mapping unit 206.

When the maximum brightness display capability DP of the CE monitor 207 exceeds the maximum brightness PL assumed on the master monitor 103a, namely DP>PL, the display mapping processing unit 206 performs the high brightness processing that allocates the level exceeding the brightness CL to the range up to the peak brightness DP by using a predetermined algorithm.

Figure 12:
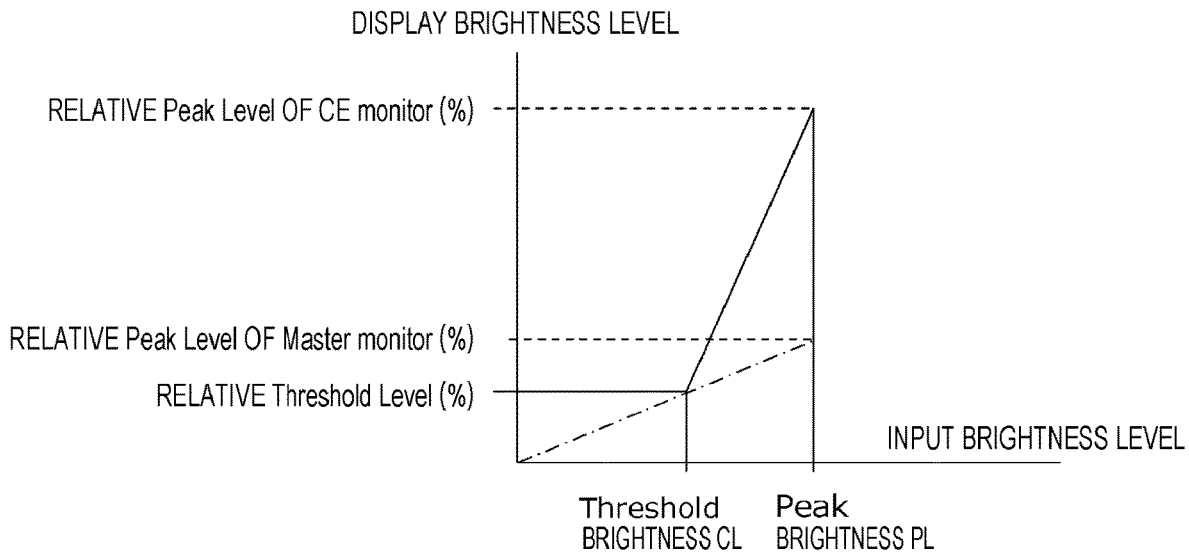
FIG. 12 is a graph illustrating an example of a display brightness characteristic of a CE monitor.

FIG. 12 illustrates the display brightness characteristic of the CE monitor 207 in that case. The characteristic includes the brightness conversion characteristic of the display mapping unit 206. A horizontal axis and a vertical axis of the graph represent the input brightness level and the display brightness level, respectively. The display brightness level equals a relative threshold level (%) when the input brightness level equals the threshold brightness CL. Moreover, the display brightness level equals a relative peak level (%) of the CE monitor 207 when the input brightness level equals the peak brightness PL.

Moreover, when the maximum brightness display capability DP of the CE monitor 207 is lower than the maximum brightness PL assumed on the master monitor 103a, namely DP<PL, the display mapping processing unit 206 performs the low brightness processing that allocates the level exceeding the brightness CL to the range up to the peak brightness DP by using a predetermined algorithm.

Figure 13:
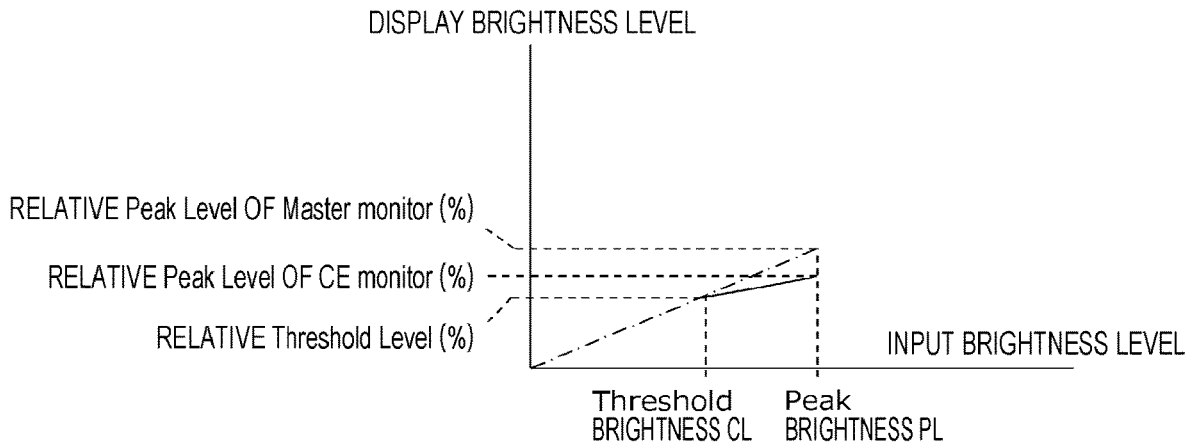
FIG. 13 is a graph illustrating an example of the display brightness characteristic of the CE monitor.

FIG. 13 illustrates the display brightness characteristic of the CE monitor 207 in that case. The characteristic includes the brightness conversion characteristic of the display mapping unit 206. A horizontal axis and a vertical axis of the graph represent an input brightness level and the display brightness level, respectively. The display brightness level equals a relative threshold level (%) when the input brightness level equals the threshold brightness CL. Moreover, the display brightness level equals a relative peak level (%) of the CE monitor 207 when the input brightness level equals the peak brightness PL.

Moreover, when the maximum brightness display capability DP of the CE monitor 207 is the same as the maximum brightness PL assumed on the master monitor 103a, namely DP=PL, the display mapping processing unit 206 outputs the data as is without performing the brightness conversion processing on the level exceeding the brightness CL. In this case, the brightness on the production side all across the range up to the peak level of the master monitor 103a is allocated as is to the display on the CE monitor 207.

The operation of the reception device 200 illustrated in FIG. 10 will be described briefly. The reception unit 202 receives the transport stream TS transmitted on the broadcast wave or Internet packet from the transmission device 100. The transport stream TS is supplied to the system decoder 203. The system decoder 203 extracts the video stream (elementary stream) VS from the transport stream TS.

The video stream VS extracted by the system decoder 203 is supplied to the video decoder 204. The video decoder 204 decodes the video stream VS extracted by the system decoder 203 and acquires the transmission video data V1. Moreover, the video decoder 204 extracts and transmits to the control unit 201 the parameter set and the SEI message inserted in each access unit making up the video stream VS.

When the first transmission method is adopted, the control unit 201 acquires from the level_mapping SEI message the region information indicating the region in which the brightness conversion is allowed (the information of "compliant_threshold_level" and "compliant_threshold_level_value"). Moreover, when the second transmission method is adopted, the control unit 201 uniquely detects the region information indicating the region allowing the brightness conversion (such as the information of "compliant_threshold_level" and "compliant_threshold_level_value") from the OETF specified in the VUI.

The transmission video data V1 acquired by the video decoder 204 is supplied to the HDR electro-optical conversion unit 205. The HDR electro-optical conversion unit 205 applies, to the transmission video data V1, the electro-optical transfer function (EOTF) or the like corresponding to and having the inverse characteristic of the opto-electrical transfer function (OETF) used in the HDR photoelectric conversion unit 103 of the transmission device 100, and acquires the output video data used to display the HDR image. The output video data is supplied to the display mapping unit 206.

Among the output brightness levels of the HDR electro-optical conversion unit 205, the display mapping unit 206 converts the level exceeding the brightness CL according to the maximum brightness display capability of the CE monitor 207. The output video data from the display mapping unit 206 is supplied to the CE monitor 207. The HDR image is displayed on the CE monitor 207.

As described above, according to the transmission/reception system 10 illustrated in FIG. 1, the transmission video data V1 acquired by performing the photoelectric conversion on the HDR video data is transmitted along with the region information indicating the region in which the brightness conversion is allowed (the information of "compliant_threshold_level" and "compliant_threshold_level_value"). Therefore, for example, the brightness conversion according to the display brightness capability of the CE monitor 207 is performed only in the region in which the brightness conversion is allowed on the reception side, whereby the feel of brightness intended by the production side can be reproduced satisfactorily.

2. Variation

Note that when the first transmission method is adopted in the aforementioned embodiment, the newly-defined level_mapping SEI message (refer to FIG. 7) is inserted into the part corresponding to "SEIs" of the access unit (AU). While the aforementioned embodiment illustrates the example of transmitting only one piece of the information (threshold information) of "compliant_threshold_level" and "compliant_threshold_level_value" in the level_mapping SEI message, a plurality of pieces of the threshold information can also be transmitted.

Figure 14:
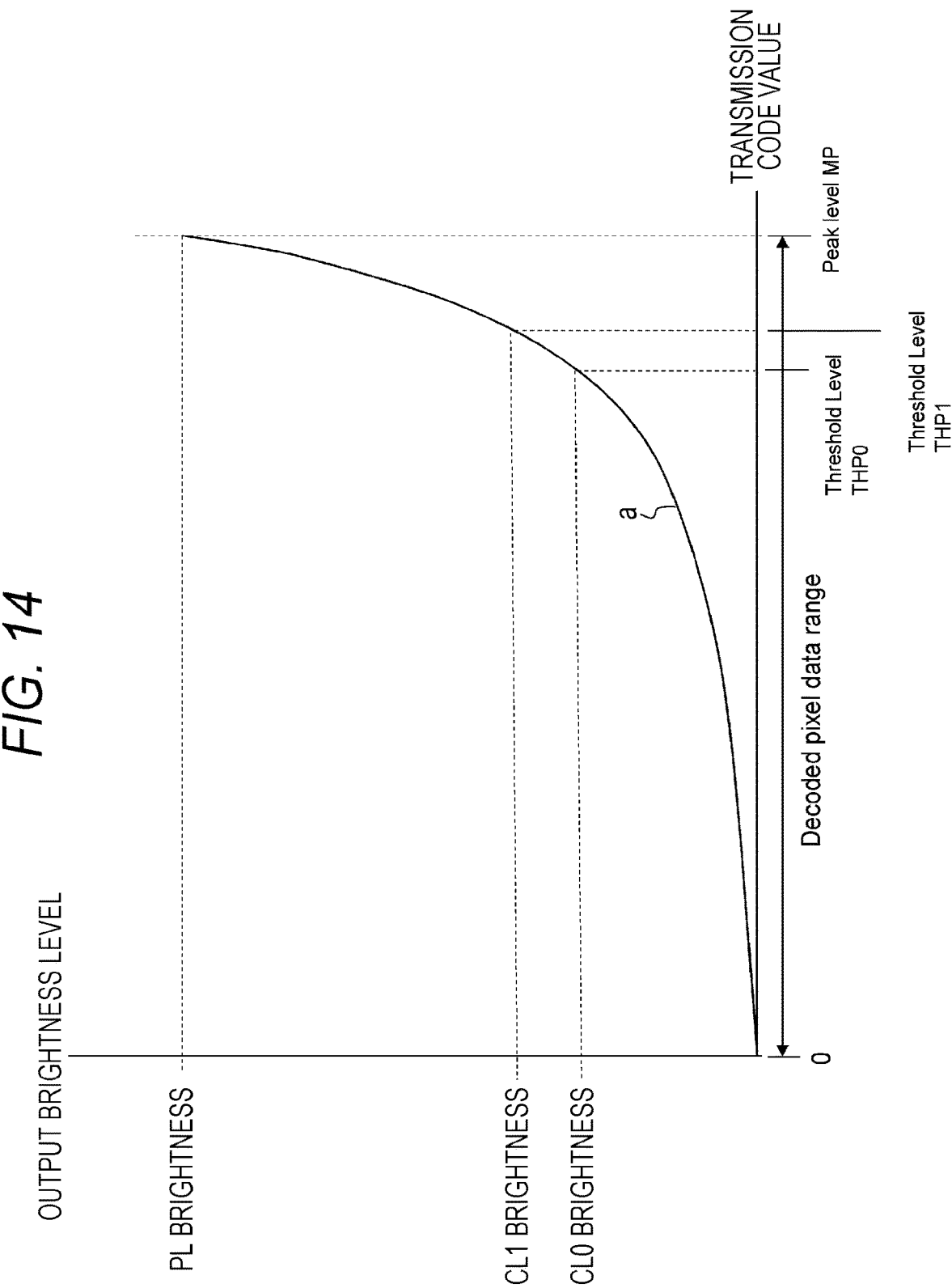
FIG. 14 is a graph illustrating an example of a relationship between the electro-optical transfer function (EOTF) of an HDR electro-optical conversion unit in the reception device and a plurality of pairs of threshold information.

FIG. 14 illustrates an example of a relationship between the electro-optical transfer function (EOTF) of the HDR electro-optical conversion unit 205 in the reception device 200 and the plurality of pairs of the threshold information. This example illustrates a case where two pieces of the threshold information are transmitted. A solid line a in the graph represents an EOTF curve. The output brightness level equals PL when the transmission code value equals the peak level MP.

Moreover, the output brightness levels equal CL0 and CL1 when the transmission code values equal threshold levels THP0 and THP1, respectively. Here, the two pairs of the threshold information (CL0, THP0) and (CL1, THP1) are provided by the level_mapping SEI message. In this case, a region with the transmission code value from 0 to THP0 is a region in which the brightness conversion is not allowed and in which the display brightness level matches when any type of CE monitor is used. Accordingly, as for the output brightness level of this region, the display mapping unit 206 does not perform the brightness conversion processing.

A region with the transmission code value from THP0 to MP is a region in which the brightness conversion is allowed. Accordingly, as for the output brightness level of this region, the display mapping unit 206 performs the brightness conversion processing according to the maximum display capability of the CE monitor 207, for example. Note however that the allowable level of brightness conversion varies between a region from THP0 to THP1 and a region from THP1 to MP. In the region from THP0 to THP1, for example, the brightness conversion can be performed in a range in which texture is saved. Moreover, the brightness conversion can be performed in the region from THP1 to MP without any restrictions.

Accordingly, the transmission of the plurality of the threshold information can allow the reception side to have variations in the display mapping processing, whereby the feel of an image on the production side can be reproduced more flexibly on various CE monitors 207.

When the aforementioned first transmission method is adopted, the plurality of the threshold information can be transmitted while being inserted into the level_mapping SEI message. When the second transmission method is adopted, one piece of the threshold information to be the basis of the specification of the opto-electrical transfer function (OETF) specified in the VUI is transmitted, whereas the other threshold information can be transmitted by using the level_mapping SEI message, for example.

Moreover, the aforementioned embodiment illustrates the example of defining and using the threshold brightness CL in addition to the reference brightness RL. However, the reference brightness RL can be synonymous with the threshold brightness CL to be used. In this case, the information of the reference brightness RL and the reference level RP (refer to FIG. 4) is also transmitted as the threshold information. The information of the threshold brightness CL and the threshold level THP need not be transmitted in this case. In that case, the reference brightness RL and the reference level RP are not necessarily limited to the 100% brightness, but another percentage can be defined as a level that matches between the transmission and reception sides.

FIG. 15 illustrates an example of the structure (Syntax) of the level_mapping SEI message that is transmitted while being inserted into the part corresponding to "SEIs" of the access unit (AU), when the first transmission method is adopted. Details of the main information in the example of the structure (Semantics) are similar to those of the level_mapping SEI message illustrated in FIG. 7. Note however that the 16-bit field of "reference_white_level" indicates a brightness value of the threshold level assuming display mapping as well as the input brightness value of the master monitor 103a at its 100%, namely the reference brightness RL.

FIGS. 16(a) and 16(b) are graphs each illustrating an example of the opto-electrical transfer function (OETF) with which the region allowing the brightness conversion is associated in advance when the second transmission method is adopted. According to the OETF of a first type illustrated in FIG. 16(a), the peak brightness equals PL1 and the corresponding transmission code value equals MP1. In the OETF of the first type, reference brightness RL1 and a reference level RP1 are defined as the region information indicating the region in which the brightness conversion is allowed. Moreover, according to the OETF of a second type illustrated in FIG. 16(b), the peak brightness equals PL2 and the corresponding transmission code value equals MP2. In the OETF of the second type, reference brightness RL2 and a reference level RP2 are defined as the region information indicating the region in which the brightness conversion is allowed.

Moreover, the aforementioned embodiment illustrates the example in which the reception device 200 performs the electro-optical conversion processing in the HDR electro-optical conversion unit 205 as well as the brightness conversion processing in the display mapping unit 206 according to the maximum brightness display capability of the CE monitor 207. However, the brightness conversion characteristic may be reflected in the electro-optical transfer function (EOTF) to be able to perform the electro-optical conversion processing and the brightness conversion processing at the same time solely by the HDR electro-optical conversion unit 205.

Furthermore, while the aforementioned embodiment illustrates the transmission/reception system 10 including the transmission device 100 and the receiver 200, the configuration of the transmission/reception system to which the present technology can be applied is not limited to the aforementioned configuration. As illustrated in FIG. 17, for example, the part corresponding to the television receiver 200 may be made up of a set top box 200A and a monitor 200B connected via a digital interface such as a high-definition multimedia interface (HDMI). Note that "HDMI" is a registered trademark.

In this case, the set top box 200A in performing the display mapping processing can determine the maximum brightness level of the monitor 200B on the basis of information acquired from EDID of the monitor 200B via the HDMI. Alternatively, when the monitor 200B performs the display mapping processing, the information including the level_mapping SEI message, the type of the EOTF and the VUI can be defined in meta-information such as a "vender specific info frame" to be shared between the set top box 200A and the monitor 200B.

Moreover, the aforementioned embodiment illustrates the example in which the container is the transport stream (MPEG-2 TS). In the present technology, however, the transport is not limited to TS, but another packet such as an ISOBMFF or MMT can be adopted to realize the layer of the video by the same method. The present technology can therefore be applied similarly to a system configured to distribute data to a reception terminal by using a network such as the Internet. Distribution on the Internet is often performed in a MP4 container or another format. That is, the container corresponds to the containers of various formats such as the transport stream adopted in a digital broadcasting standard (MPEG-2 TS) and MP4 used in the Internet distribution.

The present technology can also have the following configuration.

(1) A transmission device including:
a processing unit that acquires transmission video data by applying a predetermined opto-electrical transfer function to input video data; and
a transmission unit that transmits the transmission video data along with region information indicating a region in which a brightness conversion is allowed.

(2) The transmission device according to (1), further including an information insertion unit that inserts the region information into a layer of a video stream, wherein
the transmission unit transmits the video stream acquired by encoding the transmission video data.

(3) The transmission device according to (2), wherein
the information insertion unit inserts metadata as the region information, the metadata indicating the region in which the brightness conversion is allowed.

(4) The transmission device according to (2), wherein
the information insertion unit inserts, as the region information, a piece of information specifying the predetermined opto-electrical transfer function with which the region allowing the brightness conversion is associated.

(5) The transmission device according to any of (1) to (4), wherein
the region information includes information of a plurality of regions each having a different allowable level of the brightness conversion.

(6) A transmission method including:
a processing step of acquiring transmission video data by applying a predetermined opto-electrical transfer function to input video data; and
a transmission step of using a transmission unit and transmitting the transmission video data along with region information indicating a region in which a brightness conversion is allowed.

(7) A reception device including:

a reception unit that receives transmission video data acquired by applying a predetermined opto-electrical transfer function to input video data along with region information indicating a region in which a brightness conversion is allowed; and a processing unit that applies an electro-optical transfer function corresponding to the predetermined opto-electrical transfer function to the transmission video data and acquires output video data by performing brightness conversion processing on the basis of the region information.

(8) The reception device according to (7), wherein the reception unit receives a video stream acquired by encoding the transmission video data, and the region information is inserted into a layer of the video stream.

(9) The reception device according to (8), wherein metadata indicating the region in which the brightness conversion is allowed is inserted as the region information.

(10) The reception device according to (8), wherein a piece of information specifying the predetermined opto-electrical transfer function with which the region allowing the brightness conversion is associated is inserted as the region information.

(11) The reception device according to any of (7) to (10), wherein the region information includes information of a plurality of regions each having a different allowable level of the brightness conversion.

(12) A reception method including:

a reception step of using a reception unit and receiving transmission video data acquired by applying a predetermined opto-electrical transfer function to input video data along with region information indicating a region in which a brightness conversion is allowed; and a processing step of applying an electro-optical transfer function corresponding to the predetermined opto-electrical transfer function to the transmission video data and acquiring output video data by performing brightness conversion processing on the basis of the region information.

A main characteristic of the present technology is that the transmission video data acquired by performing the photoelectric conversion on the HDR video data is transmitted along with the region information indicating the region in which the brightness conversion is allowed, whereby the reception side performs the brightness conversion only in the region in which the brightness conversion is allowed to be able to satisfactorily reproduce the feel of brightness intended by the production side (refer to FIGS. 4 and 7).

REFERENCE SIGNS LIST 10, 10A Transmission/reception system
100 Transmission device
101 Control unit
102 HDR camera
103 HDR photoelectric conversion unit
103a Master monitor
104 Video encoder
105 System encoder
106 Transmission unit
200 Reception device
200A Set up box
200B Monitor
201 Control unit
202 Reception unit
203 System decoder
204 Video decoder
205 HDR electro-optical conversion unit
206 Display mapping unit
207 CE monitor

The invention claimed is:

1. A transmission device comprising:
circuitry configured to:
generate transmission video data by applying a predetermined opto-electrical transfer function to input video data;
transmit the transmission video data along with region information that includes a single horizontal axis value and a corresponding single vertical axis value of a brightness level on a brightness conversion function which separates a first region of brightness levels in which a first brightness conversion is applied and a second region of brightness levels in which a second brightness conversion is applied;
generate a video stream by encoding the transmission video data;
insert the region information into a layer of the video stream; and
transmit the video stream,
wherein an algorithm of the first brightness conversion is different from an algorithm of the second brightness conversion,
wherein a curvature of the brightness conversion function on one side of a point defined by the single horizontal axis value and the corresponding single vertical axis value is different from a curvature of the brightness conversion function on another side of the point,
wherein the algorithm of the first brightness conversion, that is different from the algorithm of the second brightness conversion, is non zero and unchanging for all values on the one side of the point defined by the single horizontal axis value and the algorithm of the second brightness conversion, that is different from the algorithm of the first brightness conversion, is non zero and unchanging for all values on the other side of the point,
wherein the circuitry is configured to insert an SEI message including the region information into the layer of the video stream, and
wherein the region information includes information of a plurality of regions of brightness levels in which different algorithms of brightness conversion are applied.

2. The transmission device according to claim 1, wherein the circuitry is configured to insert, as the region information, a piece of information specifying the predetermined opto-electrical transfer function with which the region of brightness levels in which the first brightness conversion is applied and the region of brightness levels in which the second brightness conversion is applied are associated.

3. The transmission device according to claim 1, wherein the region information indicates the region of brightness levels in which the first brightness conversion performed by a reception device depends on a capability of a display of the reception device and the region of brightness levels in which the second brightness conversion performed by the reception device does not depend on the capability of the display of the reception device.

4. The transmission device according to claim 1, wherein the circuitry is configured to transmit the region information using an Info Frame via HDMI.

5. The transmission device according to claim 1, wherein the curvature of the brightness conversion function on the one side is zero and constant.

6. The transmission device according to claim 1, wherein brightness conversion function is the predetermined opto-electrical transfer function.

7. A transmission method comprising:
generating transmission video data by applying a predetermined opto-electrical transfer function to input video data;
transmitting the transmission video data along with region information that includes a single horizontal axis value and a corresponding single vertical axis value of a brightness level on a brightness conversion function which separates a first region of brightness levels in which a first brightness conversion is applied and a second region of brightness levels in which a second brightness conversion is applied;
generating a video stream by encoding the transmission video data;
inserting the region information into a layer of the video stream; and
transmitting the video stream,
wherein an algorithm of the first brightness conversion is different from an algorithm of the second brightness conversion,
wherein a curvature of the brightness conversion function on one side of a point defined by the single horizontal axis value and the corresponding single vertical axis value is different from a curvature of the brightness conversion function on another side of the point,
wherein the algorithm of the first brightness conversion, that is different from the algorithm of the second brightness conversion, is non zero and unchanging for all values on the one side of the point defined by the single horizontal axis value and the algorithm of the second brightness conversion, that is different from the algorithm of the first brightness conversion, is non zero and unchanging for all values on the other side of the point,
wherein the inserting the region information into the layer of the video stream includes inserting an SEI message including the region information into the layer of the video stream, and
wherein the region information includes information of a plurality of regions of brightness levels in which different algorithms of brightness conversion are applied.

8. A reception device comprising:
circuitry configured to:
receive transmission video data, generated by applying a predetermined opto-electrical transfer function to input video data, along with region information that includes a single horizontal axis value and a corresponding single vertical axis value of a brightness level on a brightness conversion function which separates a first region of brightness levels in which a first brightness conversion is applied and a second region of brightness levels in which a second brightness conversion is applied, wherein an algorithm of the first brightness conversion is different from an algorithm of the second brightness conversion, a curvature of the brightness conversion function on one side of a point defined by the single horizontal axis value and the corresponding single vertical axis value is different from a curvature of the brightness conversion function on another side of the point, and the algorithm of the first brightness conversion, that is different from the algorithm of the second brightness conversion, is non zero and unchanging for all values on the one side of the point defined by the single horizontal axis value and the algorithm of the second brightness conversion, that is different from the algorithm of the first brightness conversion, is non zero and unchanging for all values on the other side of the point; and
apply the first brightness conversion and the second brightness conversion to the transmission video data on the basis of the region information to obtain output video data, wherein
the circuitry is configured to receive a video stream generated by encoding the transmission video data,
the region information is inserted into a layer of the video stream,
an SEI message including the region information is inserted into the layer of the video stream, and
the region information includes information of a plurality of regions of brightness levels in which different algorithms of brightness conversion are applied.

9. The reception device according to claim 8, wherein a piece of information specifying the predetermined opto-electrical transfer function with which the region of brightness levels in which the first brightness conversion is applied and the region of brightness levels in which the second brightness conversion is applied are associated is inserted as the region information.

10. The reception device according to claim 8, wherein the algorithm of the first region of brightness levels in which the first brightness conversion is performed by the reception device depends on a capability of a display of the reception device and the algorithm of the second region of brightness levels in which the second brightness conversion is performed by the reception device does not depend on the capability of the display of the reception device.

11. The reception device according to claim 8, wherein the circuitry is configured to apply an electro-optical transfer function corresponding to the predetermined opto-electrical transfer function to the transmission video data to obtain the output video data.

12. A reception method comprising:
receiving transmission video data, generated by applying a predetermined opto-electrical transfer function to input video data, along with region information that includes a single horizontal axis value and a corresponding single vertical axis value of a brightness level on a brightness conversion function which separates a first region of brightness levels in which a first brightness conversion is applied and a second region of brightness levels in which a second brightness conversion is applied, wherein an algorithm of the first brightness conversion is different from an algorithm of the second brightness conversion, a curvature of the brightness conversion function on one side of a point defined by the single horizontal axis value and the corresponding single vertical axis value is different from a curvature of the brightness conversion function on another side of the point, and the algorithm of the first brightness conversion, that is different from the algorithm of the second brightness conversion, is non-zero and unchanging for all values on the one side of the point defined by the single horizontal axis value and the algorithm of the second brightness conversion, that is different from the algorithm of the first brightness conversion, is non-zero and unchanging for all values on the other side of the point;
applying the first brightness conversion and the second brightness conversion to the transmission video data on the basis of the region information to obtain output video data; and receiving a video stream generated by encoding the transmission video data, wherein the region information is inserted into a layer of the video stream, an SEI message including the region information is inserted into the layer of the video stream, and the region information includes information of a plurality of regions of brightness levels in which different algorithms of brightness conversion are applied.

13. The reception method according to claim 12, further comprising applying an electro-optical transfer function corresponding to the predetermined opto-electrical transfer function to the transmission video data to obtain the output video data.

* * * * *